US008099196B2

(12) United States Patent
Keintzel et al.

(10) Patent No.: US 8,099,196 B2
(45) Date of Patent: Jan. 17, 2012

(54) CONTROL METHOD AND CONTROLLER FOR A MECHANOHYDRAULIC SYSTEM

(75) Inventors: Georg Keintzel, Steyregg (AT); Gernot Grabmair, Bad Schallerbach (AT); Kurt Schlacher, Graz (AT)

(73) Assignee: Siemens Vai Metals Technologies GmbH (AT)

( * ) Notice: Subject to any disclaimer, the term of this patent is extended or adjusted under 35 U.S.C. 154(b) by 892 days.

(21) Appl. No.: 12/063,993

(22) PCT Filed: Jun. 29, 2006

(86) PCT No.: PCT/EP2006/063684

§ 371 (c)(1),
(2), (4) Date: Feb. 15, 2008

(87) PCT Pub. No.: WO2007/020126

PCT Pub. Date: Feb. 22, 2007

(65) Prior Publication Data

US 2008/0243274 A1 Oct. 2, 2008

(30) Foreign Application Priority Data

Aug. 17, 2005 (AT) ................................ A 1378/2005

(51) Int. Cl.
*G05D 9/00* (2006.01)

(52) U.S. Cl. ........................... 700/281; 700/19; 700/304

(58) Field of Classification Search .................... 700/19, 700/20, 28, 29, 69, 275, 281, 304; 703/2, 703/6, 7, 8, 9
See application file for complete search history.

(56) References Cited

U.S. PATENT DOCUMENTS 4,502,109 A 2/1985 Delmege et al.
4,774,667 A * 9/1988 Kuraoka et al. ................. 701/78
4,881,172 A * 11/1989 Miller ............................. 701/37
5,031,506 A * 7/1991 Baisch et al. ............... 91/363 R
6,386,019 B1 * 5/2002 Eckert et al. ............... 73/114.15
(Continued)

FOREIGN PATENT DOCUMENTS

EP 0 111 064 9/1983
(Continued)

OTHER PUBLICATIONS

Honegger et al., "Model-Based Control of Hydraulic Actuated Manipulators", IEEE 2001, pp. 2553-2559.*

(Continued)

*Primary Examiner* — Kakali Chaki
*Assistant Examiner* — Carlos Ortiz Rodriguez
(74) *Attorney, Agent, or Firm* — Ostrolenk Faber LLP

(57) ABSTRACT

The invention relates to a control method for a mechanical-hydraulic system having a degree of freedom per hydraulic actuator which is embodied as a control path, and a measuring sensor which is used to measure the pressure $p_h$ of a hydraulic cylinder and a measuring sensor which is used to measure the position $x_h$ of the piston of the hydraulic cylinder. A control unit which can receive input variables of hydraulic pressure $p_h$, and hydraulic actuator position $x_h$, is provided. An observer, which determines the desired pressure of the hydraulic system and the speed $v_h$ of the hydraulic actuator, is implemented in the system. The desired pressure in the control element is taken into account in the set of rules of the control element and the speed $v_h$ of the hydraulic actuator can be over-ridden for attenuating the control element.

15 Claims, 3 Drawing Sheets

U.S. PATENT DOCUMENTS

| | | | | |
|---|---|---|---|---|
| 7,130,721 | B2 * | 10/2006 | Wear et al. | 700/282 |
| 7,142,930 | B2 * | 11/2006 | Shimada et al. | 700/29 |

FOREIGN PATENT DOCUMENTS

| | | |
|---|---|---|
| EP | 0 992 295 | 12/2000 |
| EP | 1 152 155 | 11/2001 |

OTHER PUBLICATIONS

Pandian et al., "Pressure Observer-Controller Design for Pneumatic Cylinder Actuators", IEEE 2002, pp. 490-499.*

International Search Report in foreign language dated Apr. 10, 2006, issued in corresponding PCT Application No. PCT/EP2006/063684.

International Search Report in English dated Apr. 10, 2006 issued in corresponding PCT Application No. PCT/EP2006/063684.

K. Grabmair, et al., Geometric energy based analysis and controller design of hydraulic actuators applied in rolling mills, *ECC03 CD Publication, 421.PDF*, Cambridge, GB, 2003.

English translation of Notification of Transmittal of Translation of the International Preliminary Report on Patentability mailed Jul. 10, 2008. Total 8 pages.

* cited by examiner

CONTROL METHOD AND CONTROLLER FOR A MECHANOHYDRAULIC SYSTEM

CROSS REFERENCE TO RELATED APPLICATION

The present application is a 35 U.S.C. §§371 national phase conversion of PCT/EP2006/063684, filed Jun. 29, 2006, which claims priority of Austrian Application No. A1378/2005, filed Aug. 17, 2005. The disclosure of which has been incorporated herein by reference. The PCT International Application was published in the German language.

BACKGROUND OF THE INVENTION

The present invention relates to a control method for a mechanohydraulic system with a degree of freedom for each hydraulic actuator functioning as a controlled element and a device for implementing the method.

Mechanohydraulic systems with a (mechanical) degree of freedom, that is to say systems in which, for example, a mechanical part with a degree of freedom (load system) is actuated via a hydraulic cylinder (actuator), occur, in practice, in the most diverse possible configurations, such as, for example, as a cage roller of a winch, as a loop lifter between two stands of a mill train or as a hydraulic adjuster of a stand of a mill train, but also in general applications, such as positioning tables, vibrating tables, etc. What is common to these systems is that they are basically oscillatable on account of the hydraulic oil column in the hydraulic cylinder or in other resilient elements in the load system. Mention may be made here, as representative examples in no way restricting the general validity, of applications in which, for example, a hydraulic linear cylinder moves a rotatably mounted mass, for example a cage roller, loop lifter, etc. In systems of this type, a pronounced oscillation behavior is exhibited due to the hydraulic oil column which acts in the same way as a spring. This is reflected in an undesirable tendency of the overall system to oscillate at specific points in the frequency response. The resonant frequencies occurring in this case are determined essentially by the equivalent mass of the mechanical system, the geometric conditions and the equivalent spring rigidity of the elasticities occurring, such as, for example, the compressibility of the oil column, and/or the elasticity of a roll stand, etc. It is typical, then, of such systems with pronounced resonant frequencies that they are inclined to (damped) oscillations in the event of regulating actions from outside. In control operations which are aimed, for example, at moving to a new operating point, or the leveling out of a fault introduced from outside, these oscillations in the control operations give rise to extremely undesirable transient variations of physical variables. In the abovementioned example of loop lifters, this has the effect of strip tension fluctuations which lead, in turn, to undesirable contractions of the strip. Where cage rollers are concerned, these fluctuations of the pressure of the cage roller on the strip may lead to surface damage caused by indentations.

In current practice, therefore, controllers are often set only very slowly, in order to keep the excitations of these undesirable oscillations as low as possible. One possibility, known from standard literature, is to use what are known as "notch filters", narrow-band band-rejection filters, which are aimed at avoiding the excitation of oscillations due to the controller by the directed "tuning out" of the frequency range around the resonant frequency of the system to be controlled, in terms of the controlled variable. A serious disadvantage of this method, especially in the applications mentioned, is that the characteristic of the mechanical system remains unchanged and, even though the controller itself avoids an excitation of oscillations, undetectable faults acting from outside give rise, as before, to oscillations of the system. Also, the resonant frequencies are dependent on the selected operating point.

What has a more serious effect in such systems, however, is that they generally have, as mentioned, a nonlinear behavior. The known methods, such as the use of notch filters, are methods of linear control technology and, in the case of nonlinear systems, have validity only in the vicinity of the operating point, for which the nonlinear element has been approximated by a linear system. It is immediately clear, however, for example in hydraulic linear drives, that, with a variation in the position of the piston of the hydraulic drive and consequently of the oil column, the resonant frequency also changes. In the method described above, there is the possibility of selecting a very broad notch filter, which, in turn, considerably restricts the dynamics of the overall system.

SUMMARY OF THE INVENTION

An object of the invention, then, is to develop a control method or a controller which stabilizes mechanical systems with a degree of freedom for each hydraulic actuator, that is to say a generally nonlinear overall system, over the entire operating range and, at the same time, improves the oscillation behavior of the mechanohydraulic system and, in particular, reduces the tendency of the mechanical system to oscillations by virtue of the introduction of active damping.

This object is achieved, for the control method and for the controller by the invention herein disclosed. In the control method, the desired pressure of the hydraulic system $\check{p}_h$, preferably as the term $(\check{p}_h - p_h)$, is taken into account in the control (for example, position control) and/or the speed $V_h$ of the hydraulic actuator, for example the piston of a hydraulic cylinder, is taken into account in the control as damping, for example in combination with a general function $C_3$, for example via a damping factor $k_d$ (that is to say, is locked onto a control (with the effect of parametrizable additional damping)), the desired pressure $\check{p}_h$ and/or the hydraulic actuator speed $v_h$ being determined by an observer.

The controller according to the invention has a measuring sensor for measuring the pressure $p_h$ of a hydraulic system, for example a hydraulic cylinder, and a measuring sensor for measuring the position $x_h$ of the hydraulic actuator, for example the piston of a hydraulic cylinder, and is characterized in that a control unit with the hydraulic pressure $p_h$ and hydraulic actuator position $x_h$ as input variables is provided, an observer for determining the desired pressure $\check{p}_h$ and/or the speed $v_h$ of the hydraulic actuator being implemented in the control unit, and, in the control law of the controller, the desired pressure $\check{p}_h$, preferably as the term $(\check{p}_h - p_h)$, is taken into account in the control and/or the speed $v_h$ of the hydraulic actuator is taken into account as damping, that is to say in combination with a general transfer function $C_3$ (for example, in the simplest instance, a proportional term $k_d$) (for example, can be locked onto the control). In addition, there may be provision for the measured acceleration $a_h$ of the hydraulic actuator in relation to the container (for example, hydraulic cylinder housing), surrounding the hydraulic medium applying a force to the hydraulic actuator, to be locked onto the control, as a rule in combination with a general transfer function $C_4$.

There is therefore no need for a direct measurement of $\check{p}_h$ or $v_h$, but if such is present, it may, of course, be used.

In the invention, either only the desired pressure $\check{p}_h$ in the hydraulic system or only the speed $v_h$ of the hydraulic actuator or both variables may take effect in the control.

This control method or this controller stabilizes the overall mechanohydraulic system with a degree of freedom, irrespective of the choice of the controlled variable, such as, for example, position or pressure (or regulating force). In addition, they are capable of damping the system effectively in that they extract energy from the oscillatable system in a suitable way. They therefore actively reduce the tendency of the controlled system to oscillations or, ideally, largely suppress the oscillation of the system. The control method affords the possibility of introducing active damping into the system to a differing extent, with the result that the effective damping of the system can also be set in a flexible way.

The control method is distinguished, further, by particular robustness. Even in the event of variations in the physical conditions, such as, for example, the compressibility of the hydraulic oil column, and during the occurrence of certain leakages in the hydraulic actuator, the controller is capable of stabilizing the overall system (load system plus hydraulics) reliably over the entire range restricted only by the mechanical design. Consequently, undesirable variations of controlled variables, such as, for example, strip tension or force on the strip in rolling mills, which, in turn, would be reflected in quality losses, are effectively reduced or avoided.

Further, the control circuits optimized by virtue of the active damping introduced can be set markedly more quickly, which, in turn, may bring about quality improvements or production increases, since, on the one hand, faults can be leveled out more quickly and therefore more effectively and, on the other hand, desired values are reached more quickly.

BRIEF DESCRIPTION OF THE DRAWINGS

The present invention is described below, first, for general mechanohydraulic systems with a degree of freedom for each hydraulic actuator, and then, with reference to two special unrestricting and exemplary applications, with the aid of the diagrammatic, unrestricting and exemplary FIGS. 1 to 5 in which.

DESCRIPTION OF A PREFERRED EMBODIMENT

General Illustration

Figure 1:
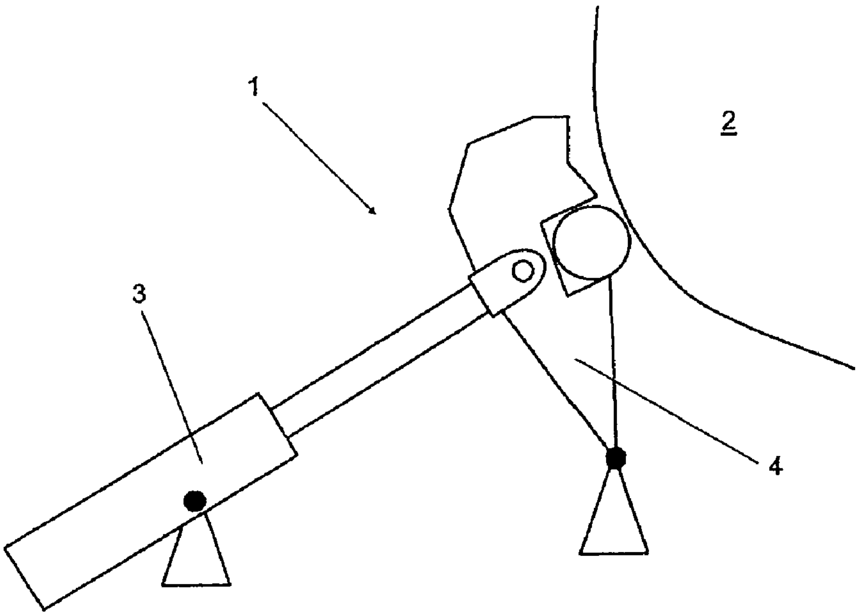
FIG. 1 shows a roughly diagrammatic illustration of a cage roller.

In general, mechanohydraulic systems with a degree of freedom may be considered, from the point of view of modeling, as being composed of a sometimes nonlinear mechanical load system (for example, cage roller, robot arm, spring/mass damper system, etc., but, for example, also only the cylinder mass of the actuator itself) and of a mostly nonlinear actuator system (build-up of the pressure or pressures) which is supplied via one or more hydraulic valves. In order, then, to impart the desired behavior to the overall system, the fluid quantity located in the actuator is stipulated in a suitable way and is supplied via one or more hydraulic valves. For this purpose, the elastic behavior of the hydraulic fluid is suitably taken into account. If the physical conditions of the load system and therefore $\check{p}_h$ are not known sufficiently accurately, for example an unknown external generalized force takes effect, the fluid quantity cannot for the time being be stipulated directly. For this reason, an observer is designed for the fluid quantity which is required for the desired state of the load system. This generally nonlinear observer may even be designed without a measurement of the generalized speed of the load system, in this case without its functioning being impaired. The controller itself, then, uses the known information, or the information obtained from the observer, on the required fluid quantity, in order to set the desired state of the overall system.

If the mechanical damping of the load system is not sufficient or is to be suitably stipulated, this may be combined with the methods described above. For this purpose, a signal dependent on the generalized speed of the load system is suitably added to the regulating signal of the above controller or controller part. This influencing of the damping may also be carried out, with an approximation of the generalized speed, from the above observer or from another suitable observer.

Unified proof of the stability of the overall controlled system is available for all the control variables listed.

Correcting Term for Taking into Account the Desired Pressure $\check{p}_h$

The fundamental equation of a (single-acting) hydraulic cylinder activated by a servovalve is sufficiently known and, on certain physical assumptions, occurs, for example, as $$\dot{x}_h = v_h$$

$$\dot{p}_h = \frac{E(-v_h A + q_v - C_l p_h)}{V_{act}}$$

with $p_h$ as the pressure in the servo-actuated chamber of the cylinder, A as the piston area, $v_h$ as the piston speed, $q_v$ as the flow from the servovalve into the hydraulic cylinder, $C_1$ as the leakage in the hydraulic cylinder, E as the modulus of elasticity of the hydraulic oil and $V_{act}$ as the oil volume in the actuated chamber. The above equation may also be extended to other variants of hydraulic actuators (such as, for example, a double-acting cylinder), as is likewise sufficiently known from the relevant literature. In order to illustrate the invention, however, it is sufficient to describe this solely in terms of a single-acting cylinder. As is evident from the above equation, therefore, pressure changes arise from changes in the volume due to piston movements, changes in the oil compression due to the supply of oil (in the case of a constant piston position) and possible leakages in the cylinder. The change itself is dependent on the current chamber volume or on the piston position.

As can easily be seen, the above fundamental equation is nonlinear. Further, this equation includes the piston speed which, in contrast to the piston position, is not usually or cannot usually be measured directly. In addition, the differentiation of the measured piston position on the basis of quantization and measurement noise gives a result which is virtually unusable. Thus, in typical applications, only the actual position and the actual pressure of the actuated hydraulic chamber are available as direct and usable measurement variables for linearization.

By means of nonlinear methods of control technology which are known from the literature, then, an exact linearization can be found which manages with this restricted measurement data record. In such a control law, then, the relative error of the hydraulic pressure of the actuated chamber in relation to the desired pressure $(\check{p}_h - p_h)$ may occur (this desired pressure being defined by a stipulatable desired position and the load system).

These methods and such a control law are described in detail in the following publications.

G. Grabmair, K. Schlacher, A. Kugi (2003): "Geometric Energy Based Analysis and Controller Design of Hydraulic Actuators Applied in Rolling Mills", ECC03 CD publication, 421.pdf, Cambridge, Great Britain.

Kugi A.: "Nonlinear Control Based on Physical Models", Lecture Notes in Control and Information Sciences 260, Springer, 2000.

Further, this is also described in the applicant's EP 992 295 A2 which is part of this disclosure.

If hydraulic adjustment is conducted in position control, then this desired value $\check{p}_h$ is typically not known a priori (since it may, for example, be highly dependent on externally acting forces unknown a priori or on elasticities, the exact numerical value of which is not known). If this desired value $\check{p}_h$ is not known, the term $(\check{p}_h - p_h)$ must be disregarded.

Investigations carried out by means of the applicant by simulations and theoretical deliberations have yielded the fact, however, that this disregarding has a destabilizing effect. If this term is taken into account, by contrast, the closed control circuit has a better damping behavior, with the result that the controller can also be set markedly more quickly. This can also be seen from a consideration of the energy of the overall system, where the mechanical damping is reduced without this term.

The following description of the invention, then, shows ways of determining the variable $\check{p}_h$.

For this purpose, first, a mathematical model (or a state description) of the controlled element, that is to say the mechanohydraulic system with a degree of freedom, is set up in the most general form. Such a general model may be derived, for example, from the sufficiently known Lagrange formalism regularly employed in control technology, that is to say via energy terms. The known Lagrange function L can in this case, for a mechanohydraulic system with a degree of freedom, be written as the difference of kinetic and potential energy, $$L = \frac{1}{2} m(q)(\dot{q})^2 - V(q) \cdot m(q)$$

is in this case the generalized mass matrix, q is the generalized coordinates, $\dot{q}$ is the time derivative of this, and V(q) is the potential. With the hydraulic force $F_h$ as the input, general state equations of the controlled element are obtained, with the generalized coordinates q and with the momentum P as state variables which constitute the basis for all applications of mechanohydraulic systems with a degree of freedom for each hydraulic actuator.

$$\dot{q} = \frac{P}{m}$$

$$\dot{P} = -\frac{1}{2}\partial_q m(q) v^2 - \partial_q V - d(q) v + \partial_q x_h(q) F_h$$

The symbol $\partial_q$ in this case means the partial derivative according to the generalized coordinates q.

This general illustration of the state equation of a mechanohydraulic system with a degree of freedom is to be adapted correspondingly for the respective application, that is to say some assumptions must be made which are to be adapted for different applications. The following example is intended, without any restriction of generality, to outline such an adaptation and to illustrate the algorithm for the determination of $\check{p}_h$.

EXAMPLE

Hydraulic (Single-Acting) Adjustment of a Roll Stand:

A hydraulic system is assumed below which acts counter to a linear spring/mass system. This gives rise to the following assumptions:

Mass and damping are movable.

The general potential V(q) can be divided explicitly into a spring potential $$c_1 \frac{q^2}{2},$$

the potential of a constant load force $F_1 \cdot q$ and a remaining term $\tilde{V}$ also formulated generally here.

This is followed, inserted into the general state equation for the controlled element, by $$\dot{q} = \frac{P}{m}$$

$$\dot{P} = F_1 - d\frac{P}{m} - c_l q - \partial_q \tilde{V} + \partial_q x_h(q) F_h$$

This state equation, then, is the basis for being able to determine the desired pressure $\check{p}_h$ via an observer. For this purpose, then, a state transformation is formulated, so that the model for the observer becomes linear, with the result that a linear observer design becomes possible. The components resulting from gravity and hydraulic force are combined as state transformation, into the new input $u_{obs}$, $u_{obs} = -\partial_q \tilde{V} + \partial_q x_h(q) F_h$. Consequently, then, as described below, an observer can be designed for the stationary state of equilibrium of $u_{obs}$. For the state of equilibrium, of course, $\dot{p} = \dot{q} = 0$ must apply. The transition from q to the deviation $\bar{q}$ (with $\bar{q} = q - \check{q}$) gives a consistent set of state equations. The third state equation for $\check{u}_{obs}$ is also written in formal terms.

$$\dot{P} = -\frac{d}{m} P - \check{u}_{obs} - c_l \bar{q} + u_{obs}$$

$$\dot{\check{u}}_{obs} = 0$$

$$\dot{\bar{q}} = \frac{1}{m} P$$

$c_1$ as the spring constant of the load system (for example, the elasticity of the material) can thus be incorporated explicitly into the observer (which, of course, can be formulated as desired). Consequently, the observer becomes robust with respect to fluctuations/uncertainties, for example the material elasticity. The load force is assumed here to be constant, so that a linear observer can be designed. At the same time, an "integral effect" of the observer is consequently achieved, which causes the error to approach zero.

This state equation of the observer with the transformed state $u_{obs}$ can then be solved by means of conventional methods of control technology, for example by means of the observer equation in continuous form and the known Ackermann formula, for the sought-after stationary state of equilibrium of $u_{obs}$. These general control methods do not have to be dealt with in detail here, but they may be presumed to be known. From this, then, the sought-after stationary equilibrium pressure $\check{p}_h$ can be determined, taking into account the selected state transformation. Variables determined by the observer are designated below by means of a roof, for example $\hat{p}_h$. With $u_{obs}=-\partial q\tilde{V}+\partial_q x_h(q)F_h$ and $F_h=A\cdot p_h$, then, $\check{p}_h$ follows immediately, with the result that the sought-after variable is determined in general form. In addition, however, as is clear from the fundamental equations, the observer also supplies the momentum which may likewise be used, as is also explained below.

EXAMPLE

Hydraulic Adjustment of the Cage Roller of a Winch

Figure 2:
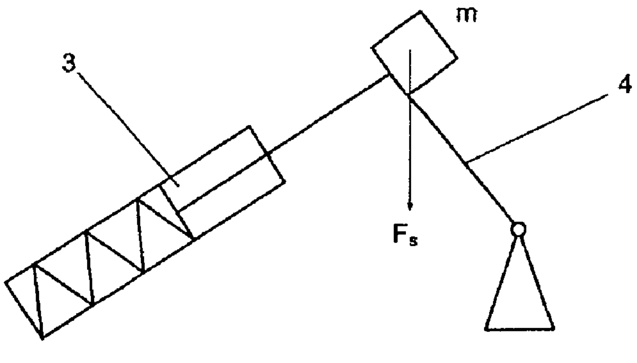
FIG. 2 shows the abstraction of the cage roller as a spring/mass system.

In order to illustrate the use of the equations written down in general above and to demonstrate general validity, a further concrete example is explained with reference to a mechano-hydraulic system with a degree of freedom in the form of a cage roller of a winch. In addition to outlining the determination of $\check{p}_h$, the active introduction of damping is presented. To press down the metal sheet during the winding operation on the winch of a hot strip mill, cage rollers, as they are known, are employed (typically, three to four cage rollers around the circumference), as illustrated roughly diagrammatically in FIG. 1. The cage roller 1 presses the metal sheet against the winch 2 via a hydraulic cylinder 3, the servovalve not being illustrated here. In this case, both the hydraulic cylinder and the cage roller arm 4 are mounted rotatably. The piston on the hydraulic cylinder 3 is likewise mounted rotatably on the cage roller arm 4. FIG. 2 shows the same system in abstracted form as a mechanical spring/mass system with a lever arm, said system being used as a model for the following deliberations.

In contrast to the previous example, with the cylinder coordinates being selected as generalized locus coordinates q, a nonconstant mass matrix will be obtained. There is, then, the general possibility of carrying out a coordinate transformation which, because of the flatness of the mass metric (the metric induced by the mass matrix), always exists and can also be calculated, so that the mass matrix appears as a constant in the transformed coordinates. In the present example, this is achieved in a simple way by a purely geometric transformation to α, the adjustment angle of the cage roller.

In general, however, this coordinate transformation (and the regulating variable transformation to $\check{u}_{obs}$) does not have to be carried out explicitly if it is taken into account implicitly in a nonlinear form of the observer, this being possible since a closed differential equation system with a nonlinear observer is present in general coordinates. In this form of the observer, work may also be carried out with a nonconstant mass matrix.

In this example, however, the coordinate and regulating variable transformation are illustrated explicitly.

Assumptions valid for the concrete application are made with regard to the general state equations of the controlled element:

q=α, the adjustment angle of the cage roller is used as a locus coordinate (coordinate transformation), from which $\dot{q}=\omega$ follows, with ω being equal to the angular speed.

m(q) corresponds to a mass matrix which in the general case is dependent on the locus coordinate q and which may be used, in principle, for the observer design. As mentioned above, in this example however, with q=α the adjustment angle is advantageously (and for reasons of clarity) selected as the locus coordinate, with the result that m(q) corresponds to the moment of inertia Θ of the cage roller and is constant, from which $\partial_q m(q)=0$ follows.

d (q)=d=const., damping is consequently position-independent.

The potential V is composed of a (constant) load moment $M_1$ and of gravity. In principle, here too, it is possible (similarly to above) to take into account an elasticity $c_1$ $$V(q)=-M_1\cdot q+\tilde{V}(q)\ \ldots\left(+c_1\frac{q^2}{2}\right)$$

These assumptions lead to the following equations:

$$\dot{q}=\frac{P}{\Theta}$$

$$\dot{P}=-d\frac{p}{\Theta}+M_1-\partial_q\tilde{V}+\partial_q x_h(q)F_h\ \ldots+c_l\cdot q$$

Figure 3:
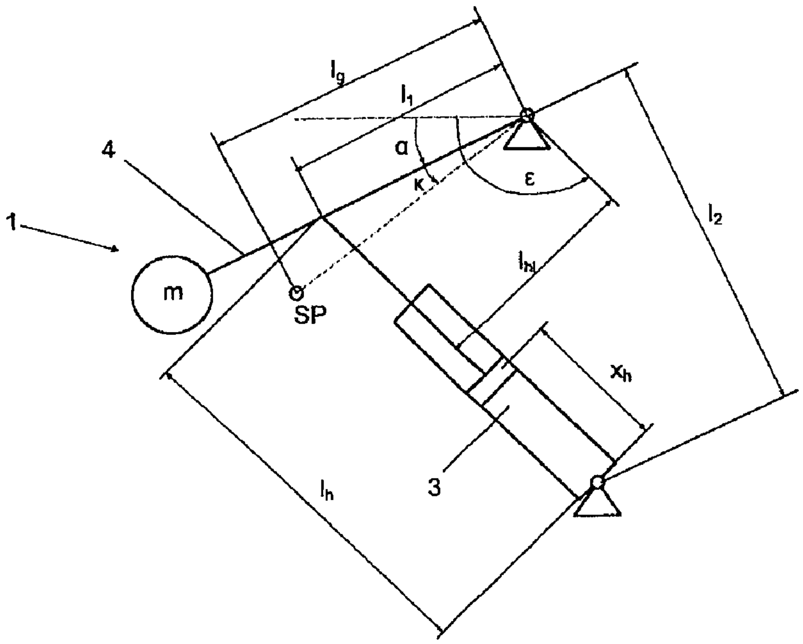
FIG. 3 shows a diagrammatic illustration of the geometric relations on the cage roller.

From the geometric relations on the abstracted spring/mass system, further relations can be derived and the above equation can be converted further. FIG. 3 shows one possible variant, including the geometric variables which may be adopted.

$\partial_q\tilde{V}(q)$: $\tilde{V}(q)$ corresponds, as mentioned, to the potential of gravity.

As shown in general above, then, a regulating variable transformation to a new input $u_{obs}$ of the form $u_{obs}=-\partial_q\tilde{V}+\partial_q x_h(q)F_h$ is carried out, which in this concrete application example leads to $u_{obs}=-\partial_q\tilde{V}+\partial_q x_h(q)F_h=M_g+M_h$. The state of equilibrium again becomes $\dot{p}=\dot{q}=0$ $\check{u}_{obs}=M_1$ or, in more general form, with an elasticity $c_1$ becomes $\check{u}_{obs}=M_1+c_1\cdot q$.

With the formal introduction of the new state $\check{u}_{obs}$ and with the transition to relative coordinates for q, the following ultimate state equations for the observer are then obtained $$\dot{P}=-\frac{d}{\Theta}P-\breve{u}_{obs}-c_l\bar{q}+u_{obs}$$

$$\dot{\breve{u}}_{obs}=0$$

$$\dot{\bar{q}}=\frac{1}{\Theta}P$$

The state $\check{u}_{obs}$ can then be determined again from this equation. By the generalized coordinates being reverted to measured coordinates, here $x_h$, $\check{p}_h$ can again be determined.

With this method, illustrated first in general and subsequently with reference to a concrete example, it is shown that the stationary equilibrium pressure $\check{p}_h$ can be determined by an observer and a preceding state transformation. This method can be applied in a similar way to all mechanohydraulic systems with a degree of freedom for each hydraulic actuator, and only the geometric and mechanical relations of the respective system have to be taken into account.

As already mentioned above, however, the observer not only supplies the stationary equilibrium pressure ↔but also the momentum $\hat{P}$, from which the nonmeasurable speed of the hydraulic piston can then be determined in a simple way by the relation $$\hat{v}_h = \frac{\hat{P}}{m}$$

and is then likewise available and can likewise be used, as required.

Figure 4:
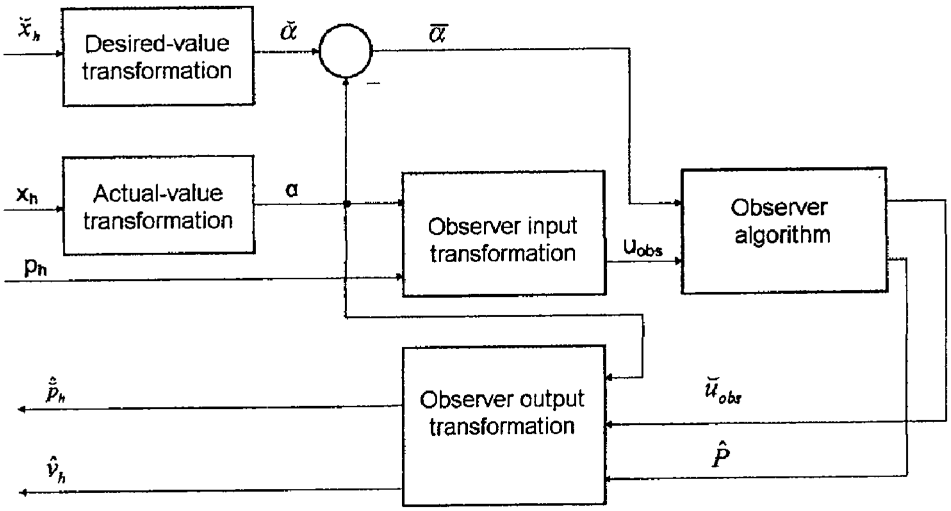
FIG. 4 shows a diagrammatic illustration of the observer.

In FIG. 4, the relations described above to the observer are described once again with reference to an observer diagram. The observer itself uses input and output variables which differ from those actually measurable or required. On the one hand, the measurable input variable in the form of the position $x_h$ is transformed to an angle $\alpha$ via the geometric relations. Furthermore, an observer state transformation to the new state $u_{obs}$ is necessary. From the variables $\overline{\alpha}$ and $u_{obs}$ determined in this way, the observer determines the state $\breve{\hat{u}}_{obs}$ and the momentum $\hat{P}$. The stationary equilibrium pressure $\breve{\hat{p}}_h$ follows by inverse transformation from $\breve{\hat{u}}_{obs}$, and the speed $\hat{v}_h$ can be determined in a simple way from the momentum $\hat{P}$.

Introduction of (Parametrizable) Active Damping

A hydraulic cylinder with a servovalve as activation has, considered in a known way as a controlled element, an integral behavior. It is likewise known that, in a mechanical system, a damping term is proportional to a speed. In order, therefore, to introduce damping into an integral element, an acceleration-proportional variable must consequently be locked onto the element. This may take place directly, in that the acceleration is measured and is locked onto an actuator (servovalve) via a damping member with a damping $k_d^a$, as is sufficiently known.

While the present invention was being prepared, however, it was found that damping is also established when a speed-proportional variable is locked onto a controlled hydraulic element with an integral behavior. To be precise, it was shown that, under specific parameter restrictions, a "differentiating effect" is established. What is critical for this is the ratio between the damping $k_d$ and the proportional amplification of the controller $k_p$. In this case, in general, $k_d > k_p$ applies, and $k_p$ is to be selected such that specific stability criteria are fulfilled. Of course, no absolute, generally valid ratio of $k_d$ to $k_p$ can be specified, since this depends, of course, on the actual conditions of the element. These parameters are therefore to be adapted to the element, for example by means of tests or via simulations with conventional programs, such as, for example, MATLAB. However, since the speed is likewise an output variable of the observer, by virtue of this knowledge an additional damping can be introduced into the system very simply, this having a highly advantageous effect on the control of the system.

These relations, then, will be explained by means of the diagrammatic illustration of the control concept according to FIG. 5.

Figure 5:
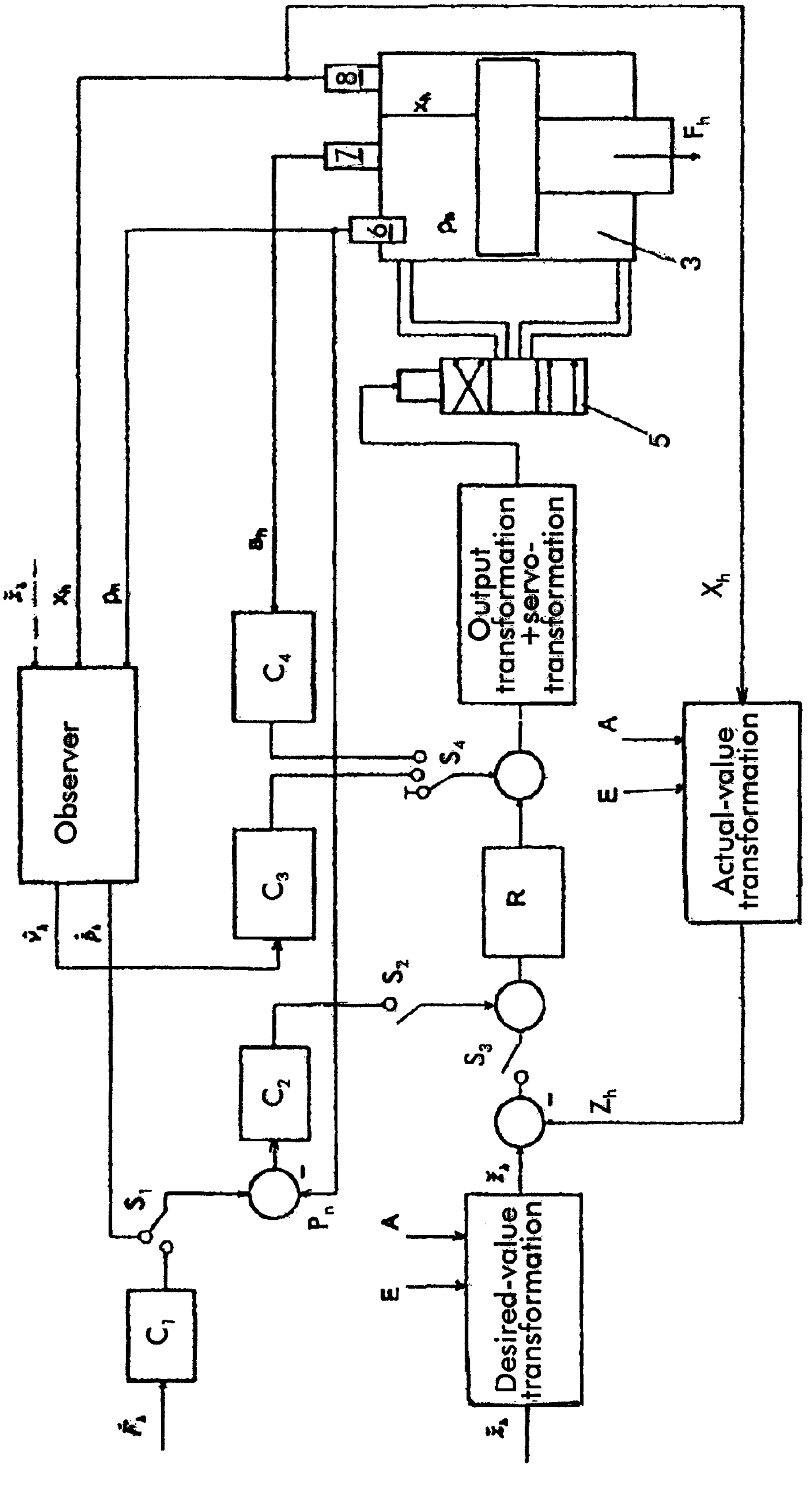
FIG. 5 shows a diagrammatic illustration of the control concept.

The controlled element is formed by the mechanohydraulic system with a degree of freedom for each hydraulic actuator, of which FIG. 5 illustrates the hydraulic cylinder 3 with activation via a servovalve 5. The servovalve 5 may activate a single-acting cylinder or, as indicated in FIG. 5 by the dashed double line, also a double-acting cylinder. Other forms of construction of hydraulic cylinders or other actuators based on the hydraulic principle may just as well be envisaged. A pressure sensor 6, an acceleration sensor 7 and a position sensor 8, which supply suitable actual-value measurement signals for control, are provided on the hydraulic cylinder 3.

As described in the applicant's EP 992 295 A2, control is based on an above-described state transformation for the desired, actual and regulating variable, so that a linear controller can be implemented. As is known from control technology, the controller R may be, for example, any desired transfer function (in the simplest instance, for example, a proportional member with proportional amplification $k_p$). A servovalve 5 has a typically nonlinear behavior which could be compensated by means of known servocompensation. The control law for this conventional control has already been described above. When the control is to be operated in this way in the form of position control, the switches $S_2$ and $S_4$ must be opened and the switch $S_3$ must be closed. The switches $S_1$ to $S_4$ do not, of course, have to be actual electromechanical switches, but could, of course, also be implemented only in software.

In force control of the hydraulic force $F_h$, the transformation of the desired and actual value is unnecessary for a possible embodiment of the controller and can simply be activated by changing over the switch $S_1$ to force input, by closing the switch $S_2$ and by opening the switch $S_3$. That is to say the position deviation is switched away and the pressure desired values and pressure actual values can be stipulated directly.

The elements $C_1$, $C_2$, $C_3$ and $C_4$ make it possible to adapt their respective inputs and, in their most general form, illustrate functions, with the input and, if appropriate, other variables as parameters. They may be simplified (linear) dynamic systems or, in the simplest instance, a proportional factor.

This already known control, then, can be extended in a simple way, in that the term $(\breve{p}_h - p_h)$ is taken into account, for which purpose the switch $S_1$ is changed over to pressure input and the switches $S_2$ and $S_3$ are to be closed. In this case, the observer supplies the stationary equilibrium pressure [|$] $ˆ$$[|$]$ˆAĥ$\hat{p}_h$, as described above in general and by means of concrete examples. Additional damping is consequently introduced into the control.

A further additional damping can be introduced into the system in that the switch $S_4$ is changed over either to speed-proportional or to acceleration-proportional damping via $C_3$ or $C_4$. In speed-proportional damping, the observer supplies the speed $\hat{v}_h$. $C_3$ makes it possible, for example, to have a dynamic adaptation of the observed signal both in terms of an optimal signal characteristic and in terms of an adaptation of the extent of the introduced damping (in the simplest instance, $C_3$ corresponds to a proportional term $k_d$ as described above). In acceleration-proportional damping, the acceleration sensor 7 supplies the required acceleration. $C_4$ has the same task as $C_3$ (again, in the simplest instance, a proportional term $k_d^a$). If such an acceleration sensor 7 is not present, this part of the control may also be absent.

It follows from this that the controller can be operated in a plurality of different modes, as required. The transfer functions $C_1$, $C_2$, $C_3$, $C_4$, R may, of course, likewise be different for the various modes.

A control described above may, of course, be implemented particularly advantageously in a control unit, such as, for example, a computer. The necessary variables, such as hydraulic pressure $p_h$, cylinder position $x_h$, or the stipulatable desired variables, but also a hydraulic force (for force control), are detected by the measurement sensors and made available to the control unit as input variables. The output variable of the control unit is typically an activation signal for the servovalve, such as, for example, the servovalve flow $q_v$ or the servovalve piston position $x_s$.

Basically, by means of the control described, any mechanohydraulic system with a degree of freedom for each hydraulic actuator can be controlled with increased stability and damping, and the invention is not restricted to the applications described here.

The invention claimed is:

1. A control method for a mechanohydraulic system which includes at least one hydraulic actuator and with a degree of freedom for each of the hydraulic actuators, each of the hydraulic actuators being a controlled element operated by a controller, and each of the hydraulic actuators having a desired pressure $\check{p}_h$, the method comprising:

receiving a measured pressure $p_h$ and a measured position $x_h$ of each respective hydraulic actuator by an observer in the mechanohydraulic system;

determining by the observer a desired momentum $\hat{p}$ of each of the hydraulic actuators and, from this, a desired non-measurable speed $\hat{v}_h$ of each of the hydraulic actuators;

determining by the observer the desired pressure $\check{p}_h$ of each of the hydraulic actuators;

taking into account the desired pressure $\check{p}_h$ of each of the hydraulic actuators and the desired non-measurable speed $\hat{v}_h$ of each of the hydraulic actuators in the control method, and locking the desired non-measurable speed $\hat{v}_h$ of each of the hydraulic actuators onto the hydraulic actuator for which the respective desired non-measurable speed $\hat{v}_h$ is specified as damping, wherein a variable proportional to the desired non-measurable speed $\hat{v}_h$ of each of the hydraulic actuators is locked onto the output signal of the controller to damp the hydraulic actuator for which the respective desired non-measurable speed $\hat{v}_h$ is specified; and utilizing a switch for locking a measured acceleration $a_h$ of each of the hydraulic actuators onto the hydraulic actuator for which the respective measured acceleration $a_h$ is measured as damping, when a measured acceleration $a_h$ is present, wherein a variable proportional to the measured acceleration $a_h$ of each of the hydraulic actuators is locked onto the output signal of the controller to damp the hydraulic actuator for which the respective measured acceleration $a_h$ is measured.

2. The control method as claimed in claim 1, wherein the observer uses a mathematical model of the controlled element, in which model a first input variable $u_{obs}$ is subjected to a regulating variable transformation to a new input variable $\check{u}_{obs}$, so that the mathematical model of the controlled element becomes linear for the observer.

3. The control method as claimed in claim 2, wherein the mechoanohydraulic system is represented as a mathematical model derived using methods of analytical mechanics, the mathematical model being derived with the aid of the Lagrange formalism $$\dot{q} = v = \frac{p}{m}$$

$$\dot{p} = \frac{d}{dt}(m \cdot v) = \frac{1}{2}\partial_q v - \partial_q m(q) v^2 - d(q)v + \partial_q x_h(q) F_h.$$

4. The control method as claimed in claim 3, further comprising, in the case of a nonconstant mass matrix, performing a coordinate transformation and a regulating variable transformation for the observer design, such that the mass matrix is presented as a constant in the transformed coordinates.

5. The control method as claimed in claim 4, wherein, for the nonconstant mass matrix, the control method further comprises using a nonlinear observer which takes into account implicitly the coordinate transformation and the regulating variable transformation.

6. The control method as claimed in claim 4, wherein the transformations are to a second input variable $u_{obs}=-\partial_q \tilde{V}+\partial_q x_h(q) F_h$.

7. The control method as claimed in claim 1, wherein the desired pressure $\check{p}_h$ of each of the hydraulic actuators is determined by inverse transformation by means of a state determined by the observer functioning as a disturbance variable observer.

8. The control method as claimed in claim 1, wherein the desired pressure of each of the hydraulic actuators is equal to $(\check{P}_h - P_h)$.

9. The control method as claimed in claim 1, wherein the desired non-measurable speed $\hat{v}_h$ of each of the hydraulic actuators is locked, in combination with a general transfer function, onto a closed control circuit of the controller, the general transfer function including the variable proportional to the desired non-measurable speed $\hat{v}_h$ of each of the hydraulic actuators.

10. The control method as claimed in claim 1, wherein the measured acceleration $a_h$ of each of the hydraulic actuators is locked, in combination with a general transfer function, onto the controller, the general transfer function including the variable proportional to the measured acceleration $a_h$ of each of the hydraulic actuators.

11. A controller for a mechanohydraulic system including at least one hydraulic actuator and the mechanohydraulic system providing a degree of freedom for each hydraulic actuator, wherein each hydraulic actuator is a controlled element, the mechanohydraulic system comprising:

at least one first measuring sensor for measuring the pressure $p_h$ of each respective hydraulic actuator, at least one second measuring sensor for measuring the position $x_h$ of each respective hydraulic actuator, at least one control unit for receiving the respective pressure $p_h$ and the respective position $x_h$ as input variables, and an observer element in the at least one control unit operable for determining a desired momentum $\hat{p}$ of each respective hydraulic actuator and, from this, a desired non-measurable speed $\hat{v}_h$ of each respective hydraulic actuator, and for determining a desired pressure $\check{p}_h$ of each respective hydraulic actuator, wherein the desired pressure $\check{p}_h$ is taken into account in a control law of the at least one control unit, and wherein a variable proportional to the desired non-measurable speed $\hat{v}_h$ of each respective hydraulic actuator is locked onto the output signal of the at least one control unit as damping each respective hydraulic actuator for which the respective desired non-measurable speed $\hat{v}_h$ is specified, wherein the at least one control unit is operable such that a measured acceleration $a_h$ of each respective hydraulic actuator, in combination with a general transfer function, can be locked onto the at least one control unit as damping.

12. The controller as claimed in claim 11, wherein the desired non-measurable speed $\hat{v}_h$ of each respective hydraulic actuator, in combination with a general transfer function, can be locked onto a closed control circuit, the general transfer function including the variable proportional to the desired non-measurable speed $\hat{v}_h$ of each respective hydraulic actuator.

13. The controller as claimed in claim 11, wherein the controller is switchable between a plurality of control modes in which various dampings are locked on.

14. The controller as claimed in claim 11, wherein the hydraulic system comprises at least one hydraulic cylinder.

15. The controller of claim 14, wherein each hydraulic cylinder includes a piston of the cylinder.

* * * * *